June 7, 1932.  C. R. CRAWFORD  1,861,688
FLY SWATTER
Filed Jan. 7, 1929
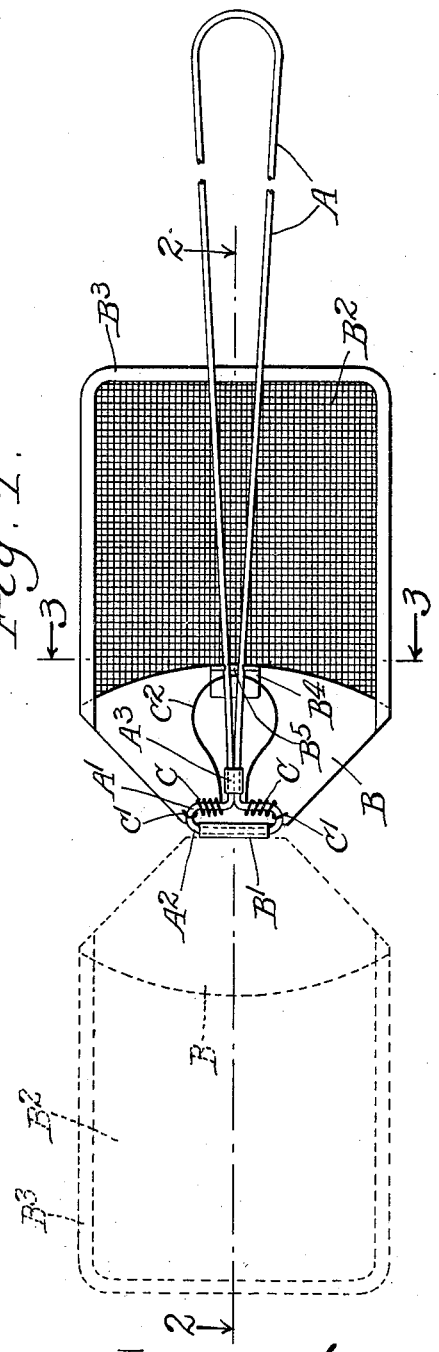
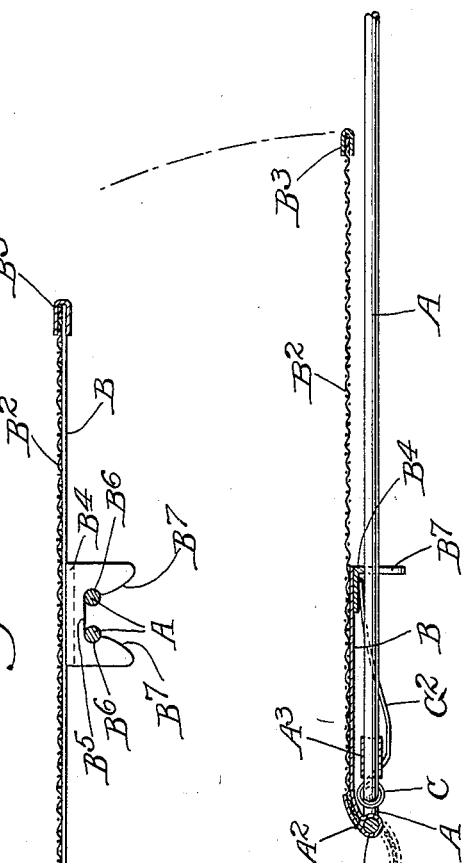
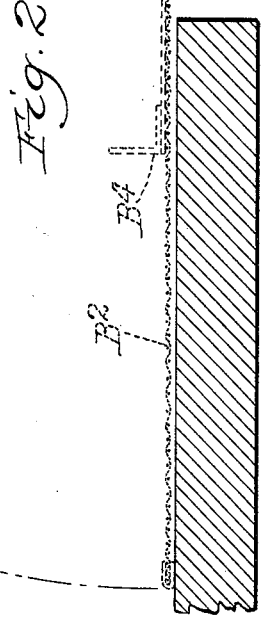
Inventor
Carmi R. Crawford
Parker + Carter
Attorneys.

Patented June 7, 1932

1,861,688

UNITED STATES PATENT OFFICE

CARMI R. CRAWFORD, OF CHICAGO, ILLINOIS, ASSIGNOR TO ARTHUR C. PRINCE, OF CHICAGO, ILLINOIS

FLY SWATTER

Application filed January 7, 1929. Serial No. 330,822.

This invention relates to an implement for striking flies and insects. It is generally referred to as a fly swatter. It has for one object to provide a simple construction in which the striking element itself moves with relation to the handle and is given an added impetus in addition to that which it has as a result of the movement of the device as a whole. Other objects will appear from time to time in the course of the specification and claims.

The invention is illustrated more or less diagrammatically in the accompanying drawing wherein:

Figure 1 is an inverted plan view;

Figure 2 is a section on an enlarged scale taken on line 2—2 of Figure 1;

Figure 3 is a transverse, vertical cross section taken on line 3—3 of Figure 1 on an enlarged scale;

Like parts are indicated by like characters throughout the specification and drawing.

In the form illustrated herewith the device includes a handle which may be made of a wire forming one spring loop A and a second and normally smaller spring loop $A^1$. The second loop will usually have a flat side or face $A^2$. $A^3$ is a securing member, in this case, a metallic band which holds the sides of the handle together and forms a division between the loops A and $A^1$. As here shown, the handle is made of a yielding wire, such as a spring wire.

The striking elements is formed of a base member B which may be made of sheet metal, and is provided with a generally tubular or cylindrical portion $B^1$ which is mounted about the flat portion $A^2$ of the loop $A^1$ and adapted to rotate there about. Fastened to the base portion B and strengthened thereby is the main striking part $B^2$. In the form here shown it is made of netting, such as mosquito netting. It is provided with a retaining and reinforcing edging $B^3$. $B^4$ is a handle engaging catch secured to the base part B and preferably adjacent its outer edge. As shown, it is provided with a central depression $B^5$ in the ends of which are formed a pair of notches $B^6$. The edges $B^7$ of the depression $B^5$ are rounded and curved to the notches $B^6$.

C is a spring. Its two ends $C^1$, $C^1$ are secured preferably to the loop portion $A^1$. The spring itself is coiled about one side of the loop portion $A^1$ and is provided with a central loop $C^2$ which extends outward from the loop $A^1$ and is adapted to bear against the base portion B. When the striking part of the fly swatter is in the position shown in Figures 1 and 2, the spring C is compressed, and the spring loop $C^2$ bears against the base portion B and tends to drive it upward and outward in the direction indicated by the dotted lines in Figure 2.

It will be obvious that while I have shown and described an operative device, many changes may be made in the size, shape, relation and disposition of parts without departing materially from the spirit of my invention; and I wish, therefore, my showing and description to be considered as in a large measure diagrammatic.

The use and operation of this device are as follows:

When it is desired to use the device the sides of the loop A are compressed together. The striking member is rotated in the position shown in full lines in Figure 2 and the sides of the handle loop A are engaged in the notches $B^6$, as shown generally in Figures 1 and 2 and in detail in Figure 3. The device is then moved toward a fly or other insect and when it is the proper distance away, the sides of the loop A of the handle are compressed together and they are thus free to expand and in doing so through the loop $C^2$ it rotates the striking part into the dotted line position as indicated in Figure 2. This may be done without any swinging movement of the device as a whole or it may be done in addition to such swinging movement. The device may be thus swung at an insect and just at the last moment the sides of the striking part are therefore swung outward and toward the insect with a greater impetus than that given to the device as a whole.

I claim:

1. In combination in a fly swatter, a compressible handle, a striking element mounted for rotation upon said handle, said handle being compressible to latchingly engage said striking element to hold it against movement, and motive means to swing said striking element when free, said handle being compressed to a greater extent to free said striking element for swinging movement under the influence of said last mentioned part.

2. In combination in a fly swatter, a transversely compressible handle, a striker, and a member for moving the two with relation to each other, when said member is free to act, a latch part on said striker engageable with the handle, the handle when compressed transversely serving to release said latch part from engagement with it.

3. In combination in a fly swatter, a deformable handle, a striker, and a spring for moving the two with relation to each other, when said spring is free to act, a latch part on said striker engageable with the handle, the handle being deformed when the latch part is moved into engagement with it and being deformable to a greater extent by the grasping pressure of an operator to release said latch part from engagement with it.

4. In combination in a fly swatter, a handle and a striker, the two joined together for relative movement, and a spring means interposed between the handle and striking element to move the striker with respect to the handle, said means being mounted entirely upon one of them and bearing against the other.

5. In combination in a fly swatter, a handle and a striker, the two joined together for relative movement, and a spring means interposed between the handle and striking element to move the striker with respect to the handle, said spring means being mounted entirely upon one of them and bearing against the other, and means for removably engaging the striker to the handle at a point other than that at which they are joined, to prevent relative movement of the parts.

6. In combination in a fly swatter, a handle having a part deformable under the grasp of an operator, a striking element pivotally mounted on the handle, spring means interposed between the striking element and handle to move the striking element when desired, and latch means carried by the striking element and operatively engageable with the deformable part of the handle to restrain the striking element against movement, the latch being releasable by deformation of the handle under pressure of the operator's grasp.

7. In combination in a fly swatter, a handle, a striking element pivotally mounted thereon, spring means for imparting striking movement to the striking element, and cooperating latch means carried by the striking element and handle for restraining said spring means, said handle having a portion deformable under pressure of an operator's grasp to release said latch to release the striking element for movement under the influence of said spring.

8. In combination in a fly swatter, a handle having a transversely deformable portion, a striking element pivotally mounted on the handle, motive means for driving the striking element, and latch means carried by the striking element and handle for restraining the motive means, said latch means being releasable by transversely deforming said handle portion to allow said motive means to drive the striking element.

9. In combination in a fly swatter, a handle including a loop of resilient wire, a striking element pivotally mounted on said handle, motive means for driving the striking element, and a lug carried by the striking element having a shoulder engageable with the loop of said handle to restrain the striking element against movement, said loop being deformable under the grasping pressure of the operator to release the striking element for movement under the influence of the motive means.

Signed at Chicago, county of Cook and State of Illinois, this 31st day of December, 1928.

CARMI R. CRAWFORD.